(12) United States Patent
Bonne

(10) Patent No.: US 9,020,747 B2
(45) Date of Patent: Apr. 28, 2015

(54) METHOD FOR RECOGNIZING A TURN-OFF MANEUVER

(75) Inventor: Uwe Bonne, Buettelborn (DE)

(73) Assignee: GM Global Technology Operations LLC, Detroit, MI (US)

( * ) Notice: Subject to any disclaimer, the term of this patent is extended or adjusted under 35 U.S.C. 154(b) by 563 days.

(21) Appl. No.: 13/418,772

(22) Filed: Mar. 13, 2012

(65) Prior Publication Data

US 2012/0239269 A1 Sep. 20, 2012

(30) Foreign Application Priority Data

Mar. 16, 2011 (DE) .......................... 10 2011 014 081

(51) Int. Cl.
*B60W 30/16* (2012.01)
*G08G 1/16* (2006.01)

(52) U.S. Cl.
CPC .................. *G08G 1/16* (2013.01); *B60W 30/16* (2013.01); *B60W 2550/308* (2013.01)

(58) Field of Classification Search
USPC .................... 701/96, 300, 301; 340/435, 436; 382/103, 104, 107
See application file for complete search history.

(56) References Cited

U.S. PATENT DOCUMENTS

| 7,804,980 | B2 | 9/2010 | Sasaki |
| 8,112,223 | B2 | 2/2012 | Jordan et al. |
| 8,131,444 | B2 | 3/2012 | Urban et al. |
| 2009/0164109 | A1* | 6/2009 | Maruyama ..................... 701/116 |
| 2009/0248267 | A1 | 10/2009 | Boecker |
| 2010/0315217 | A1* | 12/2010 | Miura et al. .................. 340/436 |
| 2011/0052003 | A1* | 3/2011 | Cobb et al. .................... 382/103 |
| 2012/0176499 | A1* | 7/2012 | Winter et al. ................. 348/148 |

FOREIGN PATENT DOCUMENTS

| DE | 102004047081 A1 | 4/2006 |
| DE | 102005036049 A1 | 2/2007 |
| DE | 102006051961 A1 | 5/2008 |
| DE | 102007058242 A1 | 6/2009 |
| DE | 102008063579 A1 | 9/2009 |

OTHER PUBLICATIONS

German Patent Office, German Search Report for Application No. 102011014081.6, dated Nov. 10, 2011.

* cited by examiner

*Primary Examiner* — Thomas G Black
*Assistant Examiner* — Peter D Nolan
(74) *Attorney, Agent, or Firm* — Ingrassia Fisher & Lorenz PC

(57) ABSTRACT

A driver assistance system of an observing vehicle uses a method that includes, but is not limited to recognizing a turn-off maneuver of a vehicle preceding the observing vehicle and further includes, but is not limited to identifying at least one first and one second reference point on the preceding vehicle in pictures of the preceding vehicle taken successively by a camera, where the reference points, in transverse direction of the preceding vehicle, are spaced apart, determining the distance from the images of the reference points in the pictures. and recognizing a turn-off maneuver if it is determined that there is a reduction in distance.

19 Claims, 2 Drawing Sheets

METHOD FOR RECOGNIZING A TURN-OFF MANEUVER

CROSS-REFERENCE TO RELATED APPLICATION

This application claims priority to German Patent Application No. 10 2011 014 081.6, filed Mar. 16, 2011, which is incorporated herein by reference in its entirety.

TECHNICAL FIELD

The technical field relates to methods and apparatus for recognizing, in a following observing vehicle, a turn-off maneuver or a turn-off intention of a vehicle in road traffic.

BACKGROUND

Numerous driver assistance systems are known which, in an observing vehicle, monitor the distance to a preceding vehicle and control the driving speed of the observing vehicle in order to avoid bumping into it. A driver assistance system of this kind can, by considerably slowing down the observing vehicle, avoid damage to the vehicle and injuries to life and limb of the occupants. Braking applications by the driver assistance system, however, which objectively unnecessary or which does not make sense to the occupants of the vehicle, are perceived only as a considerable hindrance to the driving comfort and can greatly impair the acceptance of such driver assistance systems in public.

A frequent cause for an unnecessary or seemingly unnecessary braking operation is when the preceding vehicle slows down directly ahead of a turn-off maneuver. Generally a human driver has no difficulty in assessing the intention of the driver of the preceding vehicle, be it because the latter indicates his intention of turning off by switching on his indicator because he can see a turn-off ahead, or for other reasons. In such a case a human driver tends to reduce a safe distance normally maintained in relation to the preceding vehicle in order not to have to operate the brakes unnecessarily. If a driver assistance system brakes in such a situation this is perceived by the driver as being erroneous behavior and is rejected.

The DE 10 2008 063 579 A1 discloses a driver assistance system, which in such a situation allows for a more flexible reaction. The system comprises a means for assessing the turn-off maneuver including a stereo camera with an angular resolution function. A turn-off maneuver is recognized in that the preceding vehicle suddenly appears wider in the pictures supplied to the stereo camera. This widening is due to the fact that the preceding vehicle not only offers its rear but also its flank to the stereo camera. However, this presumes that there is a large enough distance between the vehicles in order to allow the stereo camera of the observing vehicle to see the flank at all. The shorter the distance is between the vehicles, the greater the angular deviation between the vehicles must be, so that this can be the case. The conventional driver assistance system, unfortunately, is therefore at its most insensitive in a traffic situation, in which fast and safe braking is desired.

It is at least one embodiment to provide a method for recognizing a turn-off maneuver of a preceding vehicle, the sensitivity of which does not decrease as distance to the preceding vehicle is progressively reduced. In addition, other objects, desirable features and characteristics will become apparent from the subsequent summary and detailed description, and the appended claims, taken in conjunction with the accompanying drawings and this background.

SUMMARY

A method is provided according to an embodiment that comprises identifying at least one first and one second reference point of a preceding vehicle in successive pictures taken by a camera. The reference points are spaced apart in transverse direction of the preceding vehicle. The method also comprises determining the distance from the images of the reference points in the pictures and recognizing a turn-off maneuver in case a reduction in distance is determined. Whilst the conventional method is based on a silhouette appearing wider during turn-off of the whole of the preceding vehicle, the method according to the embodiment is based on a perspective compression resulting from a turning movement of the preceding vehicle, of the apparent distance between the previously determined reference points, which are visible also while the preceding vehicle is driving straight ahead.

Preferably the reference points are the two rear lights of the preceding vehicle, on the one hand because they are usually the reference points spaced furthest apart and all that is available on the preceding vehicle visible to the observing vehicle at any time, and on the other because, when they light up during a braking operation preceding the turn-off, they can easily and safely be identified in the pictures taken. Preferably, although the reduction in distance between the images of the reference points is a necessary condition, it is not a sufficient condition for recognizing a turn-off maneuver. In order to permit safe recognition, the distance between the observing vehicle and the preceding vehicle is conveniently monitored, and a turn-off maneuver is recognized only if the reduction in distance between the images of the reference points is more than a possible simultaneous increase in distance between the vehicles.

The distance between the vehicles is conveniently measured with respect to a third reference point which lies between the first and the second reference points on the preceding vehicle. Further, it is convenient that an indicator on the preceding vehicle is monitored, and that a factor by which the reduction in distance between the reference points must at least be more than the increase in distance between the vehicles in order to lead to recognition of the turn-off maneuver, is smaller when the indicator is operated than when it is not. Activating the indicator is therefore not sufficient on its own for leading to the recognition of a turn-off maneuver. A driver assistance system making use of the method according to the invention for controlling the distance to the preceding vehicle would therefore not reduce a safety distance to the preceding vehicle not solely because this vehicle uses the indicator, for an activated indicator may be forgotten or it may have been activated a long time before the intended turn-off.

A further criterion for a possibly intended turn-off of the preceding vehicle is the presence of a turning-off lane. This can be ascertained, on the one hand, in the pictures supplied by the camera, on the other there is the possibility to ascertain the position and driving direction of the observing vehicle in a map of for example a vehicle navigation system, in order to determine in this way whether a turning-off lane is marked in the map along the path of the observing vehicle. A further possibility is to examine the pictures for a sideways movement of the preceding vehicle. Such a sideways movement may take place in turning-off direction, but it may also be the opposite to the intended turning-off direction of the preceding vehicle, for example because the rear of the preceding vehicle swings away when negotiating a turn or because the driver of the preceding vehicle, prior to negotiating a bend, initially turns the vehicle contrary to the direction of the bend in order to be able to then negotiate the bend at an enlarged radius.

A driver assistance system is also provided for a vehicle with an apparatus for measuring the distance to a preceding vehicle, a camera for taking pictures of the preceding vehicle, a delay device for delaying the vehicle or for generating a warning signal when the measured distance to the preceding vehicle drops below a minimum distance and determination device for determining the distance between reference points of the preceding vehicle from images of the pictures taken by the camera, for recognizing a turn-off maneuver in case the distance between the images decreases and for lowering the minimum distance if a turn-off maneuver is recognized.

Based on the above explanations and due to driver assistance systems as well as navigation systems are traditionally implemented on the basis of microcomputers, a further embodiment is a computer program product with program code, which enables a computer to perform the above-described method. Such a computer may have one or even more co-operating processors. In particular processors of a driver assistance system and of a navigation system may cooperate in order to represent a joint computer which performs the method.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or the following detailed description.

Figure 1:
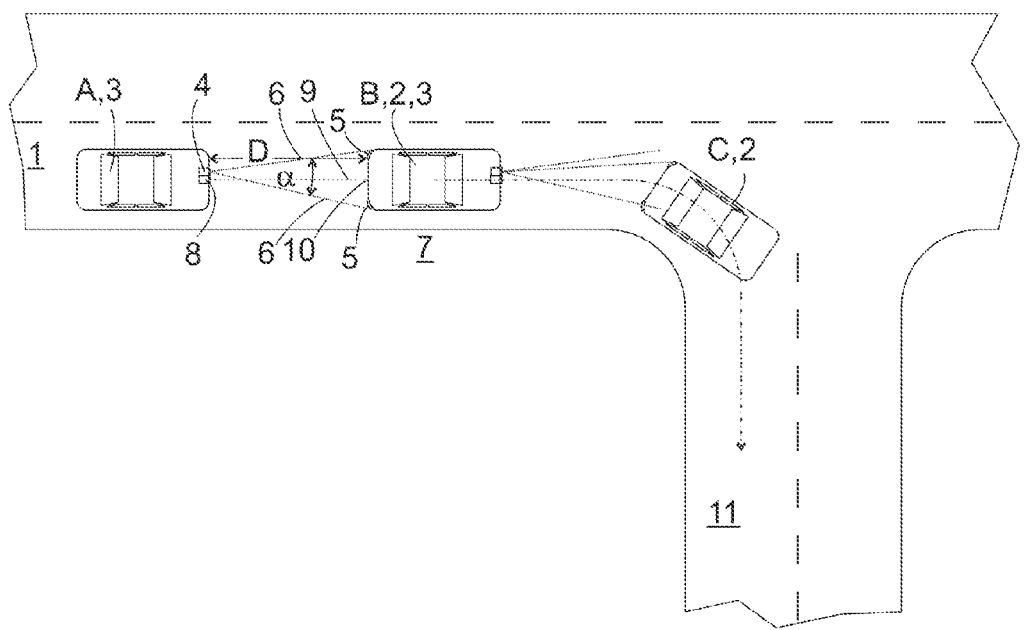
FIG. 1 shows a schematic illustration of a typical application of an embodiments.

FIG. 1 shows, in a schematic top view, a road 1 with two motor vehicles, a preceding vehicle 2 and an observing vehicle 3 which, at a first point in time, occupy positions A or B, and, at a later point in time, positions B or C. The observing vehicle 3 carries a camera 4 that is directed towards the lane ahead of it and thus towards the rear of the preceding motor vehicle 2. The camera 4 is shown here on the front rim of the bonnet of motor vehicle 3, and thus approximately level with the rear lights 5 of the preceding motor vehicle 2, however, for a better view of the road 1, it may also be mounted at a higher level of the observing vehicle 3, possibly on the roof of the passenger cell and preferably in the upper area of its windscreen 6, between this and an internal rear mirror of the passenger cell. The field of view of camera 4 is sufficiently large in order to capture the preceding motor vehicle 2 and the edge 7 of the road adjacent to the preceding vehicle 2. The focal length of the lens of camera 4 is fixed so that the distance between the images of the two rear lights 5, in the pictures generated by camera 4, is a measure for an angle α formed by rays emanating from the rear lights 5 at the location of camera 4.

Apart from the camera 4 the observing vehicle 3 comprises a further proximity sensor 8. This may be a distance sensor, for example a radar or lidar sensor, which emits a measuring ray 9 in driving direction of vehicle 3 in forward direction in order to determine the distance D between vehicles 2, 3 by way of radiation reflected from the rear of the preceding vehicle 2. The proximity sensor 8 is arranged on a longitudinal center plane of the observing vehicle 2 in order to impact on the rear of the preceding vehicle 2 essentially in the center. The measuring ray 9 may be sharply focused in order to permit an exact measuring of the distance to a point of impact 10 on vehicle 2. If this point of impact 10 is situated in the center of the rear of vehicle 2, the measured result is substantially independent of a turn of vehicle 2 and independent of the turning direction. It would also be feasible to use a fanned-out measuring ray or several measuring rays in order to generate a distance-measuring value averaged over the width of the rear of vehicle 2. Alternatively the proximity sensor 8 could be a second camera of roughly the same type as camera 4, which is disposed transversely to the driving direction and offset in relation to camera 4 and which supplies a further image of the same scenery as camera 4, but from a different angle of view.

If at the second point in time the observing vehicle 3 has reached position B occupied by the preceding vehicle 2 at the first point in time, the preceding vehicle 2 has moved closer to location C. When both vehicles 2, 3 are travelling at the same speed, the distance D between them does not change. At location C the preceding vehicle 2 is just about to turn off into a cross road 11. The driving directions of vehicles 2, 3 are no longer the same, and the camera 4 no longer views the rear section of the preceding vehicle frontally, but obliquely. The angle α' now opened up by the rays of rear lights 5 at the location of camera 4 is distinctly smaller than angle α.

A driver assistance system of the observing vehicle 3 that is connected to camera 4 makes use of this change in angle or of the resulting distance change in the images of the rear lights 5 in the pictures supplied by camera 4, in order to recognize the turn-off maneuver of the preceding vehicle 2.

Figure 2:
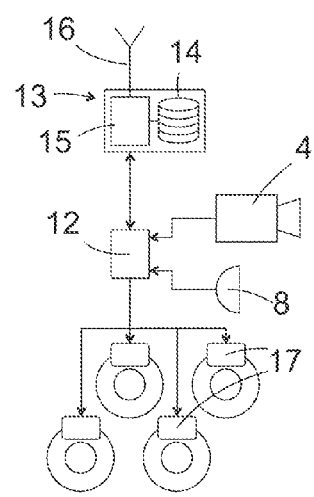
FIG. 2 shows a schematic block diagram of a driver assistance system according to an embodiment.

FIG. 2 schematically shows the structure of this driver assistance system. A processor 12 is connected to camera 4 and proximity sensor 8. If the second camera is provided as the proximity sensor 8 instead of the distance sensor which is able to immediately supply a measured value of distance D between vehicles 2, 3, it is up to the processor 12 to identify the preceding motor vehicle 2 in the pictures supplied by the two cameras 4 and to calculate the distance D to the preceding motor vehicle 2 from differences between the pictures resulting from the different perspective. The processor 12 is further adapted to perform the already mentioned recognition of rear lights 5 from the images supplied by camera 4 and the determination of the distance between their respective images from the pictures of camera 4.

Processor 12 may further be connected for bidirectional data exchange to a motor vehicle navigation system 13. The navigation system 13 encompasses, in the known manner, a memory 14 containing map data in a digital form, as well as a processor 15 which is connected to the memory 14 and a wireless interface 16, in order to determine the geographical position of motor vehicle 3 by way of satellite signals received from the wireless interface, and to determine by way of the thus determined position and the digital map data, at which location of which road registered in these map data the vehicle 2 is to be found. Navigation systems with this capability are generally known so that the methods carried out for position determination and identification of the road used need not be described in detail at this point. Conventional navigation systems utilize this capability, following entry of the driving destination by the driver at a user interface not shown in FIG. 2, in order to continuously supply the driver with hints for required turn-off maneuvers aimed at reaching the target. The invention processor 12 communicates with the navigation system 13 in order to obtain information on roads branching off from the currently used road 1, such as cross road 11, before this is reached, independently of whether in order to reach the destination, it is necessary or meaningful to drive along these branching-off roads. In order for the processor 12 to receive this information processor 15 of navigation system 13 may be programmed to answer regular enquiries by processor 12 concerning future branching-off cross roads or concerning the distance to the next branch-off; but it is also feasible for processor 12 to access memory 14 directly in order to obtain this information itself using the position of vehicle 2 supplied by processor 15. The distance D to the preceding motor vehicle 2, which is supplied by proximity sensor 8 or calculated using data of proximity sensor 8 and camera 4, is utilized by processor 12 for controlling brakes 17 of the vehicle or for generating warning hints for the driver, as will be explained below in more detail.

Figure 3:
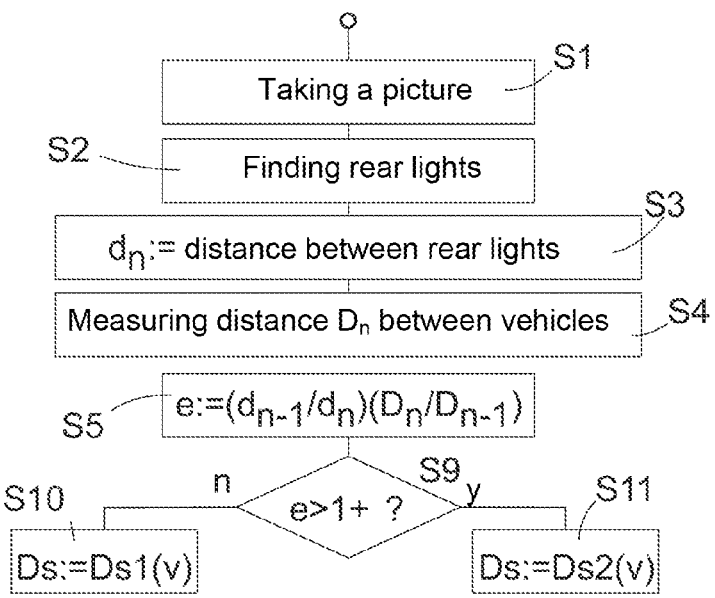
FIG. 3 shows a flow diagram of a working method of the driver assistance system according to an embodiment.

FIG. 3 is a flow diagram of a working method carried out by processor 12 according to an embodiment, which does not require the existence of the navigation system 13 or which does not make use of its data. The method has cyclical iterations of the steps shown in FIG. 3. In a first step S1 camera 4 supplies a picture to the processor 12. In step S1 processor 12 examines the picture for a preceding vehicle. If there is none, the iteration stops at this point. Otherwise processor 12 looks for the rear lights 5 of the preceding vehicle 2 in the picture and measures the distance do of its images in the picture in step S3.

A simultaneous measurement of distance Dn between observing vehicle 3 and preceding vehicle 3 may take place independently of image acquisition and image evaluation with a proximity sensor 8 or, if the proximity sensor 8 also has a camera, processor 12 undertakes the measuring of distance Dn by triangulation in the pictures taken simultaneously by camera 4 and proximity sensor 8. Measured values obtained in earlier iterations of the method of distance dn−1 from images of the rear lights or of distance Dn−1 of vehicles Dn−1 are stored in processor 12. These stored values may be values obtained, in particular, in the directly preceding iteration of the steps of FIG. 3 or they may be averaged values obtained across several iterations, in particular this may be a sliding mean value. In step S5 processor 12 calculates a comparative figure e from current or earlier distance measurements according to the formula:

$e=(dn-1/dn)(Dn/Dn-1)$.

If the vehicles 2, 3 drive one behind the other along a straight path, the distance between the images of the rear lights is inversely proportional to the distance of vehicles 2, 3 from each other, and the comparative figure e does not change, irrespective of the distance of vehicles 2, 3 from one another. However, if the distance in the images of the rear lights reduces without the distance of the vehicles becoming proportionally greater, then e>1, and this is an indication that the preceding vehicle 2 moves into another direction than the observing vehicle 3.

In step S9 processor 12 compares the figure e with 1+ wherein is a small positive rational number. If comparison e is smaller, there is no indication that the preceding vehicle 2 is turning off, and the processor sets a minimum distance Ds between the vehicles 2, 3 by way of a first preset function Ds1(v) of the speed v of vehicle 3 (S10). If, however, it is determined that e is greater than 1+, then this indicates the intention of the preceding vehicle 2 to turn off, and in step S11 the minimum distance Ds is fixed at a speed-dependent value Ds2(v), which is smaller than Ds1(v).

If in a subsequent comparison it is ascertained that Dn<Ds, i.e., when the actual distance of vehicles 2, 3 drops below the minimum distance Ds, processor 12 operates brakes 17 in order to slow the vehicle 3 down so that for the subsequent iteration of the steps of FIG. 3 a distance Dn+1>Dn is measured and—possibly following further iterations, the minimum distance is also maintained. The magnitude of the braking operation may be preset as a function of Ds−Dn and/or of Dn−1−Dn and may extend up to an emergency stop in order to achieve, for a big drop below the minimum distance Ds or for a fast reduction in distance, for example due to an emergency stop or a rear-end collision of the preceding vehicle 2, an adequate slow-down also of the observing vehicle 3 which is sufficient for avoiding a collision.

Another possibility is that, when processor 12 realizes that the distance between vehicles 2, 3 drops below the minimum distance Ds, a warning is issued only to the driver in the form of an acoustic, optical or haptic signal in order to make him apply the brakes. In this way the driver can decide whether to observe the warning or whether not to brake because he considers that the traffic situation is different from that of processor 12. It is also feasible to combine both approaches described above by presetting a first functions pair Ds1(v), Ds2(v), which specifies a minimum distance to the preceding vehicle 2 without recognition of the turning-off intention or with recognition of the turning-off intention, where a warning signal is generated if the minimum value is not reached, and by presetting a second functions pair Ds1'(v), Ds2'(v), which specifies minimum distances, respectively, where braking occurs automatically if the minimum value is not reached. If Ds1(v)>Ds1'(v)/Ds2(v)>Ds2'(v), a distance range is available, respectively, in which the driver can himself decide whether to brake or not to brake, and if this distance range is not reached processor 12 triggers the braking operation.

Figure 4:
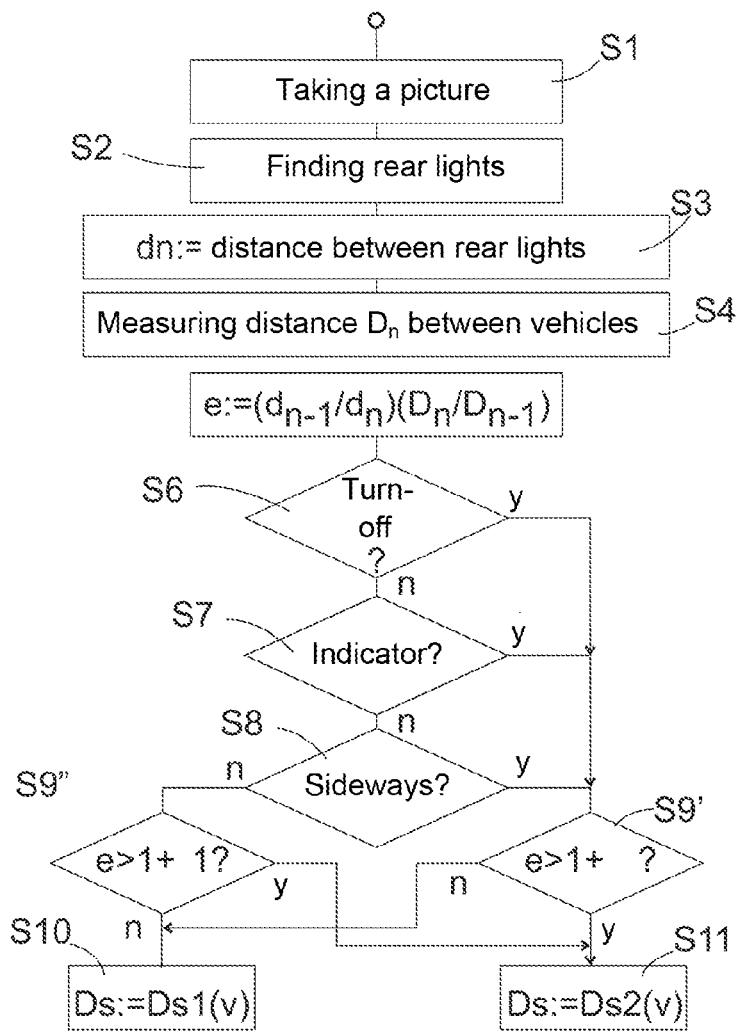
FIG. 4 shows a flow diagram of a working method according to a further embodiment.

Another embodiment of the working method of processor 12 is shown in FIG. 4. Steps S1 to S5 in FIG. 3 and FIG. 4 are identical and will therefore not be explained again. In step S6 processor 12 checks whether a branch-off lies ahead of vehicle 3. Such a check may be based, on the one hand, on the evaluation of the pictures supplied by camera 4, or on the other hand, on the communication with the navigation system 13. If a branch-off does exists, it is very probable that if the comparative value e is greater than 1, this is due, indeed, to a change in direction of the preceding vehicle 2 based on a turning-off intention. The method therefore goes to a step S9' in which, as described above with reference to step S9, the comparative value e is compared to a threshold 1+2. However the number □ of step S9 is chosen to be lower than the number of step S9, in order to increase the readiness of processor 12 to recognize indeed a turning-off intention of the preceding vehicle 2.

If no branch-off is found in step S6 this does not exclude a turning-off intention by the preceding vehicle 2, for it could mean a turning-off intention into a drive of a property which is not recorded in the map of the navigation system 13 and/or is not sufficiently recognizable in the pictures of camera 4. Therefore, processor 12 additionally evaluates pictures in step S7 supplied by the camera 4 at different times to assess the possibility of whether the preceding vehicle 2 has activated an indicator or not. If yes, this is a reliable indication of a turning-off intention, and the method goes to step S9'.

If the indicator is not activated this does nevertheless not exclude with any certainty the intention to turn off. Therefore in step S8 a check is carried out as to whether the preceding vehicle may be performing a sideways movement. Such a sideways movement can, for example, be recognized even if its rear lights 5 recognized in successive images seem to move in the same direction from one image to the next. In this case also the method changes to step S9'. Only if this last check too supplies a negative result, is a comparative step S9" reached, in which a comparison of factor e with a threshold 1+1 takes places, wherein 1 is distinctly greater than +2. If in S9' or D9" it is noticed that e is smaller than 1+2 or 1+1, a relatively large minimum distance Ds1(v) is determined, as described with reference to FIG. 3. If e is greater, it is definitely assumed that the preceding vehicle 2 turns off and the minimum distance is set to the lower value Ds2(v) in step S11.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for recognizing a turn-off maneuver of a preceding vehicle and an observing vehicle, comprising:
    identifying a first reference point and a second reference point that are spaced apart in a transverse direction from the preceding vehicle in pictures taken by a camera;
    ascertaining a distance from images of the first reference point and the second reference point in the pictures; and
    recognizing the turn-off maneuver if a reduction in the distance is determined.

2. The method according to claim 1 wherein the first reference point and the second reference point are two rear lights of the preceding vehicle.

3. The method according to claim 1, wherein a distance between the observing vehicle and the preceding vehicle is monitored and in the recognizing the turn-off maneuver is recognized only if the reduction in the distance between the first reference point and the second reference point is more than a possible simultaneous increase in the distance between the preceding vehicle and the observing vehicle.

4. The method according to claim 3, wherein the distance between the observing vehicle and the preceding vehicle is measured with respect to a third reference point, which is located on the preceding vehicle between the first reference point and the second reference point.

5. The method according to claim 3, further comprising monitoring an indicator of the preceding vehicle, wherein a factor by which the reduction in distances between the first reference point and the second reference point is greater at least than the increase in the distance between the preceding vehicle and the observing vehicle in order to recognize the turn-off maneuver is smaller for an activated indicator than it is for a non-activated indicator.

6. The method according to claim 3, further comprising examining the pictures for a presence of a turning-off lane, wherein a factor, by which the reduction in the distance between the first reference point and the second reference point must be greater at least than the increase in the distance between the preceding vehicle and the observing vehicle in order to lead to recognition of the turn-off maneuver, is smaller when the turning-off lane is present, than when it is not.

7. The method according to claim 6, further comprising:
    ascertaining a position and a driving direction of the observing vehicle in a map; and
    examining the map for the presence of the turning-off lane, wherein a second factor, by which the reduction in the distance between the first reference point and the second reference point must be greater at least than the increase in the distance between the observing vehicle and the preceding vehicle in order to lead to the recognition of the turn-off maneuver, is smaller when the turning-off lane is present than when it is not.

8. The method according to claim 3, further comprising examining the pictures for a sideways movement of the preceding vehicle, wherein a factor, by which the reduction in the distance between the first reference point and the second reference point must be greater at least than the increase in the distance between the preceding vehicle and the observing vehicle in order to lead to recognition of the turn-off maneuver, is smaller if the sideways movement is recognized than if it is not recognized.

9. The method according to claim 3, further comprising controlling a speed of the observing vehicle in order to maintain the distance between the preceding vehicle and the observing vehicle over a minimum distance.

10. The method according to claim 9 further comprising lowering the minimum distance if the turn-off maneuver is not recognized as compared to another minimum distance if the turn-off maneuver is recognized.

11. A driver assistance system for a motor vehicle comprising:
    a measuring device configured to measure a first distance to a preceding vehicle;
    a camera configured to take picture of the preceding vehicle;
    a slowing device configured to take an action if the first distance to the preceding vehicle is below a minimum distance;
    a determining device configured to:
        determine a second distance from images of reference points of the preceding vehicle in pictures of the camera;
        recognizing a turn-off maneuver if the second distance in the images decreases;
        lower the minimum distance if the turn-off maneuver is recognized.

12. The driver assistance system according to claim 11, wherein the action is to slow the motor vehicle down.

13. The driver assistance system according to claim 11, wherein the action is to generate a warning signal.

14. A non-transitory computer readable medium embodying a computer program product, said computer program product comprising:
    a recognition program for recognizing a turn-off maneuver of a preceding vehicle and an observing vehicle, the recognition program configured to:
        identify a first reference point and a second reference point that are spaced apart in a transverse direction from the preceding vehicle in pictures taken by a camera;

ascertain a distance from images of the first reference point and the second reference point in the pictures; and recognize the turn-off maneuver if a reduction in the distance is determined.

15. The non-transitory computer readable medium embodying the computer program product according to claim 14, wherein the first reference point and the second reference point are two rear lights of the preceding vehicle.

16. The non-transitory computer readable medium embodying the computer program product according to claim 14, wherein the recognition program is configured to monitor the distance between the observing vehicle and the preceding vehicle and the turn-off maneuver is recognized only if the reduction in the distance between the first reference point and the second reference point is more than a possible simultaneous increase in the distance between the preceding vehicle and the observing vehicle.

17. The non-transitory computer readable medium embodying the computer program product according to claim 16, wherein the recognition program is configured to measure the distance between the observing vehicle and the preceding vehicle with respect to a third reference point, which is located on the preceding vehicle between the first reference point and the second reference point.

18. The non-transitory computer readable medium embodying the computer program product according to claim 16, wherein the recognition program is further configured to monitor an indicator of the preceding vehicle, wherein factor by which the reduction in distances between the first reference point and the second reference point is greater at least than the increase in the distance between the preceding vehicle and the observing vehicle in order to recognize the turn-off maneuver is smaller for an activated indicator than it is for a non-activated indicator.

19. The non-transitory computer readable medium embodying the computer program product according to claim 16, wherein the recognition program is further configured to examine the pictures for a presence of a turning-off lane, wherein a factor, by which the reduction in the distance between the first reference point and the second reference point must be greater at least than the increase in the distance between the preceding vehicle and the observing vehicle in order to lead to recognition of the turn-off maneuver, is smaller when the turning-off lane is present, than when it is not.

\* \* \* \* \*